US009631991B2

(12) United States Patent
Tohyama et al.

(10) Patent No.: US 9,631,991 B2
(45) Date of Patent: Apr. 25, 2017

(54) STRAIN-GAUGE PHYSICAL QUANTITY MEASURING DEVICE WITH AN ELECTRONIC COMPONENT PROVIDED ON A FLAT SURFACE OF A CYLINDRICAL PORTION RADIALLY DISTANCED FROM A DIAPHRAGM

(71) Applicant: NAGANO KEIKI CO., LTD., Tokyo (JP)

(72) Inventors: Shuji Tohyama, Tokyo (JP); Nobutaka Yamagishi, Tokyo (JP); Naoki Yamashita, Tokyo (JP); Yusuke Midorikawa, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 0 days.

(21) Appl. No.: 14/865,568

(22) Filed: Sep. 25, 2015

(65) Prior Publication Data

US 2016/0091377 A1    Mar. 31, 2016

(30) Foreign Application Priority Data

Sep. 30, 2014    (JP) ................. 2014-201516

(51) Int. Cl.
    *G01L 9/04*      (2006.01)
    *G01L 9/00*      (2006.01)
    *G01L 19/00*    (2006.01)

(52) U.S. Cl.
    CPC .......... *G01L 9/0051* (2013.01); *G01L 9/0044* (2013.01); *G01L 9/0055* (2013.01); *G01L 19/0084* (2013.01)

(58) Field of Classification Search
CPC .......... B81B 7/0051; B81B 2201/0264; H01L 29/0673; H01L 29/0665; H01L 29/84;
(Continued)

(56) References Cited

U.S. PATENT DOCUMENTS

| 5,948,989 A | 9/1999 | Ichikawa et al. |
| 2005/0150303 A1 | 7/2005 | Maitland et al. |

(Continued)

FOREIGN PATENT DOCUMENTS

| DE | 19509188 A1 | 9/1995 |
| EP | 1118849 A1 | 7/2001 |

(Continued)

OTHER PUBLICATIONS

European Search Report dated May 31, 2016, 9 pages.

*Primary Examiner* — Harshad R Patel
*Assistant Examiner* — Brandi Hopkins
(74) *Attorney, Agent, or Firm* — Rankin, Hill & Clark LLP (57) ABSTRACT

A device includes: a sensor module; a housing that houses the sensor module; a connector provided to the housing; a terminal provided to the connector; and an elastic electrically conductive member provided in a space between the sensor module and the connector and interposed between the terminal and a pad. The sensor module includes: a ceramic module body including a diaphragm and a cylindrical portion integral with a periphery of the diaphragm; a detector provided on a flat surface of the diaphragm; and the pad and an electronic component provided on a flat surface of the cylindrical portion radially outwardly adjacent to the flat surface of the diaphragm. The pad is electrically connected to the electrically conductive member.

6 Claims, 5 Drawing Sheets

(58) Field of Classification Search
CPC . G01L 9/0051; G01L 9/0055; G01L 19/0084;
G01L 9/0044; G01L 19/0038; G01L
19/0092; G01L 19/143; G01L 9/0075;
G01L 19/147; G01L 19/04; G01L
19/0645; G01L 19/148; G01L 23/18;
G01L 9/0052; G01L 9/065; H01H
59/0009
USPC .......................... 73/720, 726, 754, 708, 717
See application file for complete search history.

(56) References Cited

U.S. PATENT DOCUMENTS

2009/0178487 A1\* 7/2009 Girroir ................ G01L 19/0092
73/716
2014/0260649 A1 9/2014 Petrucelli

FOREIGN PATENT DOCUMENTS

| EP | 2078940 A2 | 7/2009 |
| JP | 11-094668 | 4/1999 |
| JP | 2006-078379 | 3/2006 |
| JP | 2011-257393 | 12/2011 |

\* cited by examiner

STRAIN-GAUGE PHYSICAL QUANTITY MEASURING DEVICE WITH AN ELECTRONIC COMPONENT PROVIDED ON A FLAT SURFACE OF A CYLINDRICAL PORTION RADIALLY DISTANCED FROM A DIAPHRAGM

The entire disclosure of Japanese Patent Application No. 2014-201516 filed Sep. 30, 2014 is expressly incorporated by reference herein.

TECHNICAL FIELD

The present invention relates to a physical quantity measuring device including a sensor module.

BACKGROUND ART

Physical quantity measuring devices include pressure sensors for measuring pressure. An example of pressure sensors is a strain gauge pressure sensor including: a diaphragm displaceable by a pressure of an introduced fluid to be measured; a cylindrical portion integral with the diaphragm; and a detector provided to a surface of the diaphragm opposite to a surface of the diaphragm that is to be in contact with the fluid to be measured, the detector detecting a displacement of the diaphragm.

A typical example of the strain gauge pressure sensor includes: a pressure-sensitive element; a strain gauge resistance provided to the pressure-sensitive element; a flexible circuit board connecting the pressure-sensitive element and an output terminal; an ASIC (an electronic component) mounted on the flexible circuit board; and a connector attached to an end of the sensor (Patent Literature 1: JP-A-2006-78379).

Another typical example of pressure sensors different from the strain gauge type is an electrostatic capacitive pressure sensor including: a capacitive pressure-sensitive element including a diaphragm; a housing for housing the capacitive pressure-sensitive element; and a conditional electronic circuit provided on the capacitive pressure-sensitive element (Patent Literature 2: JP-A-2011-257393).

In the typical example of Patent Literature 2, the pressure-sensitive element also includes a ceramic base where the diaphragm, which is displaceable by a pressure of a fluid to be measured, is provided. The conditional electronic circuit is provided to a surface of the ceramic base opposite to the surface where the diaphragm is provided. The conditional electronic circuit is electrically connected to a sensing device terminal housed in a connector housing.

Another typical example of pressure sensors different from the strain gauge type is an electrostatic capacitive pressure sensor including a housing and a variable capacitor housed in the housing (Patent Literature 3: JP-A-11-94668).

In the typical example of Patent Literature 3, the variable capacitor includes: a rigid substrate housed in the housing; a flexible diaphragm provided to the substrate; and a signal conditioning circuit provided to the substrate. The housing is provided with a connector. The connector is attached with a connector terminal, which is electrically connected to the signal conditioning circuit.

The strain gauge pressure sensor requires that an electronic component such as an ASIC should be mounted not to interfere with the diaphragm. Therefore, a position where the electronic component is mountable is limited, so that the electronic component is attached to the flexible board in the typical example of Patent Literature 1. In order to attach the electronic component to the flexible board, the flexible board has to be fixed. Attachment of the electronic component to the flexible circuit board thus requires a complicated process. Further, the flexible board needs to be electrically connected to the pressure-sensitive element with the electronic component attached to the flexible board, which results in lowering the efficiency of an assembly process of the pressure sensor and increasing production costs.

In mounting the electronic component, the typical examples of Patent Literatures 2 and 3, which are the electrostatic capacitive type, are free from the above problem unique to the strain gauge type.

Specifically, in the typical example of Patent Literature 2, the conditional electronic circuit is provided to the surface of the pressure-sensitive element opposite to the surface where the diaphragm is provided. Since the conditional electronic circuit is distanced from the diaphragm, no interference between the conditional electronic circuit and the diaphragm occurs. Further, in the typical example of Patent Literature 2, a specific arrangement for electrically connecting the conditional electronic circuit and the sensing device terminal is not disclosed.

Likewise, in the typical example of Patent Literature 3, the signal conditioning circuit is provided to the rigid substrate distanced from the diaphragm, and thus does not interfere with the diaphragm. Further, in the typical example of Patent Literature 3, a specific arrangement for electrically connecting the connector terminal and the signal conditioning circuit is also not disclosed.

SUMMARY OF THE INVENTION

An object of the invention is to provide a physical quantity measuring device capable of being easily assembled without lowering a measurement accuracy.

According to an aspect of the invention, a physical quantity measuring device includes: a sensor module; a housing that houses the sensor module; a connector provided to the housing; a terminal provided to the connector; and an elastic electrically conductive member provided in a space between the sensor module and the connector and interposed between the terminal and the sensor module, the sensor module including: a ceramic module body including: a diaphragm displaceable by a pressure of a fluid to be measured introduced into the sensor module; and a cylindrical portion integral with the diaphragm; a detector provided on a flat surface of the diaphragm opposite to a surface of the diaphragm that is to be in contact with the fluid to be measured, the detector detecting a displacement of the diaphragm; and a pad electrically connected to the detector through an electronic component and provided on a flat surface of the cylindrical portion radially outwardly adjacent to the flat surface of the diaphragm, the pad being connected to the electrically conductive member, the electronic component being provided on the flat surface of the cylindrical portion.

In the above aspect, the sensor module is housed in the housing, a first end of the electrically conductive member is connected to an end of the terminal, and the connector is attached to the housing to cover the sensor module. When the connector is attached to the housing, the electrically conductive member is elastically deformed to be pressed to the pad, and thus reliably connected to the pad. A second end of the electrically conductive member is fixed to the pad. The terminal and the pad can thus be easily connected.

Further, in the above aspect, the electronic component and the pad are provided on the flat surface of the cylindrical portion, which is defined at a position different from that of the flat surface of the diaphragm in the module body. Therefore, even when the diaphragm is displaced by the fluid to be measured introduced into the sensor module, the displacement is not hindered by the presence of the electronic component and the like, which results in a proper measurement of a physical quantity. The displacement of the diaphragm has no mechanical influence on the electronic component. Further, the pad connected to the electrically conductive member is provided not on the flat surface of the diaphragm but on the flat surface of the cylindrical portion in the sensor module, so that the pad is pressed down by the elastic force of the elastic member without hindering the displacement of the diaphragm.

Further, the electronic component is provided on the flat surface of the cylindrical portion radially distanced from the diaphragm, so that the position and size of the pad are not limited as compared with the case where the electronic component is provided on the flat surface of the diaphragm. In other words, when the electronic component is provided on a part of the flat surface of the cylindrical portion, a large space is created at an area opposite to the area where the electronic component is provided across the diaphragm. For instance, the pad for external electrical connection can thus be provided in such a large space.

Further, since the electronic component is directly attached to the module body, which is a ceramic rigid member, the electronic component can be easily connected to the sensor module as compared with the typical example of Patent Literature 1 where an electronic component is attached to a flexible circuit board.

In the above aspect, it is preferable that the cylindrical portion is integral with a periphery of the diaphragm and has an inner circumferential surface defining an attached portion attachable to the housing, and the attached portion of the cylindrical portion is provided with a step defining a module-side flat surface extending in a radial direction of the cylindrical portion.

Since the cylindrical portion is provided with the step, a portion of the flat surface of the cylindrical portion corresponding to the step is available as a space for arranging the electronic component. The electronic component can thus be easily arranged. Further, the attached portion, which is defined near the opening relative to the step of the cylindrical portion, has an inner diameter lager than a diameter of the diaphragm, so that the outer diameter of an object to be attached with the module body can be increased.

In the above aspect, it is preferable that the physical quantity measuring device further includes a temperature measuring element provided on the flat surface of the cylindrical portion.

The temperature measuring element calibrates the measurements in accordance with the temperature. Heat of the fluid to be measured is thus accurately transmitted to the temperature measuring element through the ceramic module body, so that the measurements can be calibrated in accordance with the temperature with improved accuracy. Even when the temperature measuring element is provided at a position distanced from the side of the module body where the fluid to be measured is introduced, the measurement accuracy is not significantly lowered. Further, since the temperature measuring element is provided not to the diaphragm but to the cylindrical portion, the diaphragm can be displaced without being hindered by the temperature measuring element. It should be noted that the temperature measuring element may be a chip component attached to the flat surface of the cylindrical portion, be made by firing a paste, for instance, printed on the flat surface of the cylindrical portion, or be in any other specific form.

In contrast, Patent Literature 3 requires that a temperature-sensitive thermister is provided to a side of a diaphragm where a fluid to be measured is to be introduced, so that the measurement accuracy of the temperature-sensitive thermister is influenced by a large pressure of the fluid to be measured. Further, since an electrical conductivity of the fluid to be measured affects the temperature measurement accuracy, the thermister has to be subjected to, for instance, insulating coating.

In the above aspect, it is preferable that the connector is held in the housing by crimping.

The connector can thus be easily connected to the housing.

In the above aspect, it is preferable that a locking projection is provided to the connector, and a locking groove engageable with the locking projection is provided to an outer circumferential surface of the sensor module.

Since the connector is prevented from rotating relative to the sensor module, a connecting point between the pad and the electrically conductive member and a connecting point between the electrically conductive member and the terminal are not displaced.

In the above aspect, it is preferable that the housing includes a projection having an outer circumferential surface attachable with the attached portion of the cylindrical portion and defining therein an introduction hole through which the fluid to be measured is introduced, the projection is provided with a housing-side flat surface facing the module-side flat surface, and an O-ring is provided between the module-side flat surface and the housing-side flat surface.

The O-ring can be held with such a simple arrangement, which eliminates a process for providing only the housing with a groove having a U-shaped cross section where the O-ring is to be set. In other words, it is only necessary to provide the housing-side flat surface to a base portion of the projection. A grooving process can thus be simplified as compared with the case where a U-shaped groove is provided to the projection

DESCRIPTION OF EMBODIMENT(S)

Exemplary embodiment(s) of the invention will be described below with reference to the attached drawings.

A first exemplary embodiment of the invention will be described with reference to FIGS. 1 to 5.

Figure 1:
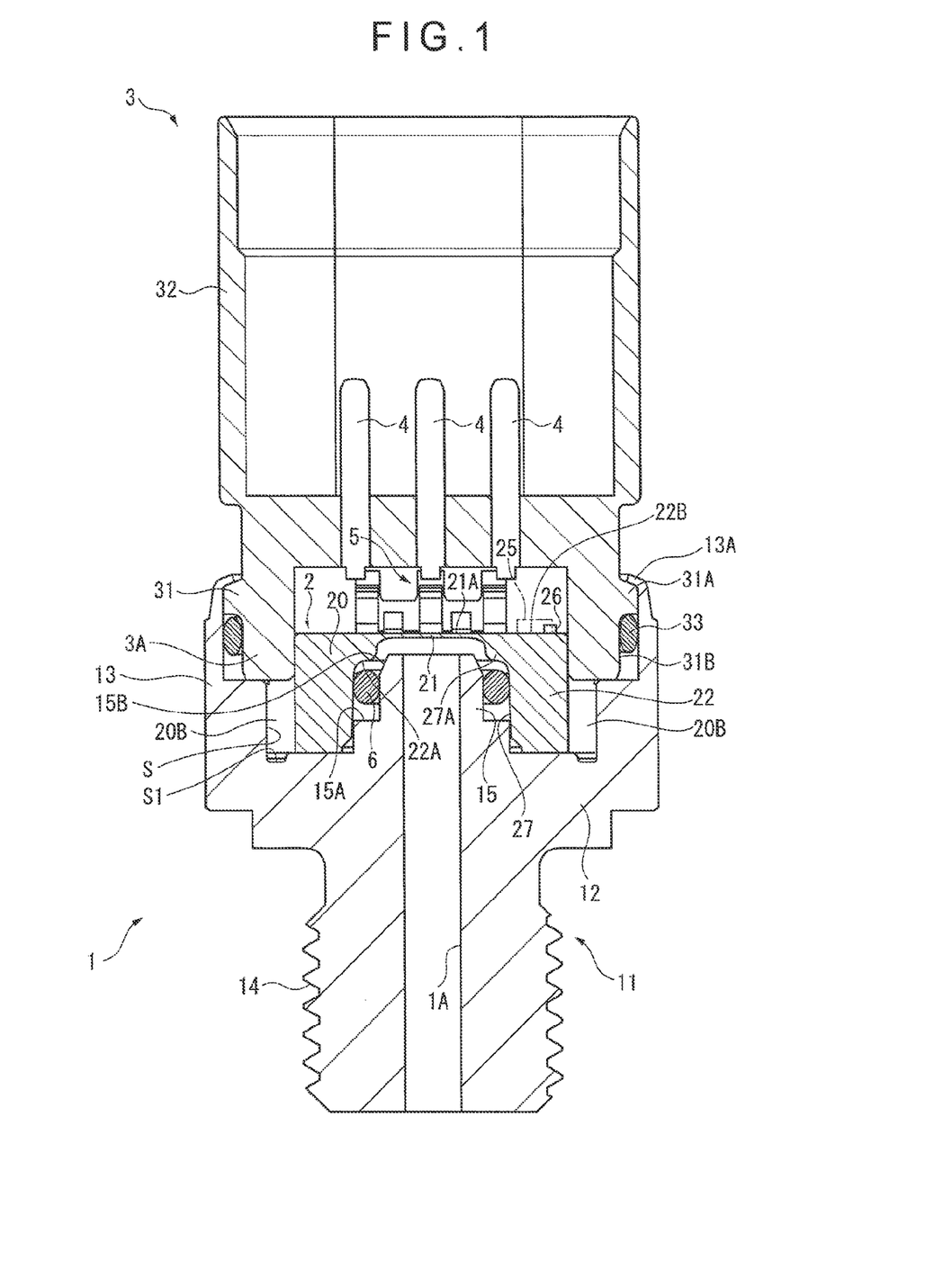
FIG. 1 is a sectional view showing an overall arrangement of a physical quantity measuring device according to a first exemplary embodiment of the invention.
Figure 2:
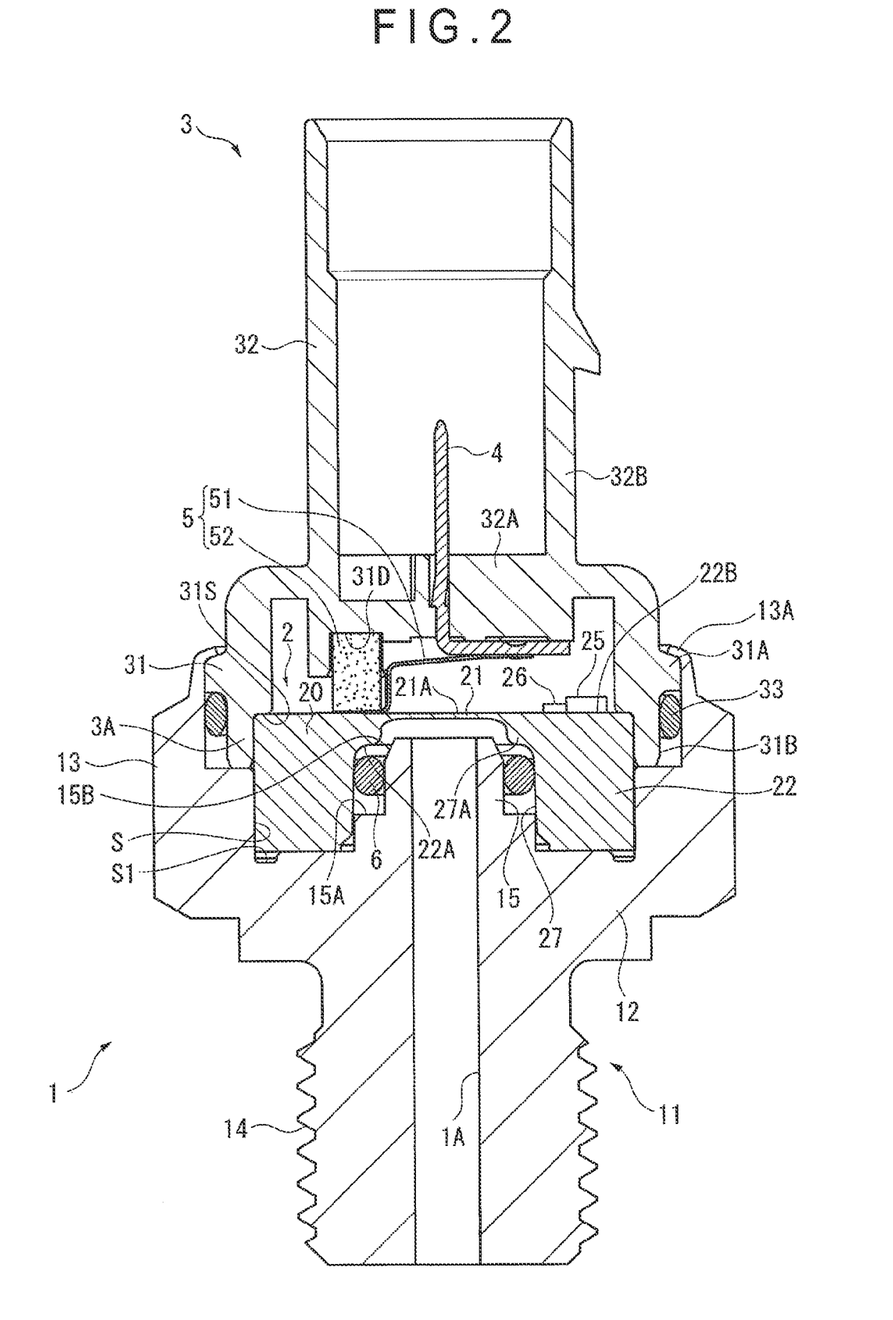
FIG. 2 is a sectional view showing the physical quantity measuring device as viewed in a direction different from the direction of FIG. 1.

FIGS. 1 and 2 show an overall arrangement of a physical quantity measuring device according to the first exemplary embodiment.

As shown in FIGS. 1 and 2, the physical quantity measuring device includes: a housing 1; a sensor module 2 housed in the housing 1; a connector 3 housed in the housing 1; three terminals 4 each provided to the connector 3; and a connecting member 5 electrically connecting the terminals 4 to the sensor module 2.

The housing 1 is a metal member and includes a joint 11 provided with an introduction hole 1A through which a fluid to be measured is introduced; a flange 12 radially extending from a middle part of the joint 11; and a sleeve 13 integral with an outer periphery of the flange 12. The fluid to be measured in the first exemplary embodiment includes liquid such as water and gas such as air.

A first end of the joint 11 defines a thread 14 that is to be screwed into a mount (not shown). A second end of the joint 11 defines a projection 15 on which the sensor module 2 is set.

A distal portion of the projection 15 has a smaller diameter than that of a base portion thereof, and thus a step is defined at a middle portion of the projection 15. A flat surface of the step is defined as a housing-side flat surface 15A, which is orthogonal to an axial direction of the projection 15 and radially extends. The projection 15 is provided with a distal inclined surface 15B with a diameter that is reduced toward a distal end of the projection 15.

The flange 12, the projection 15 and the sleeve 13 in combination define a space S for housing the sensor module 2. The space S is in communication with a recess S1 provided to a peripheral flat portion of the flange 12. The recess S1 defines an annular flat surface with a predetermined width. The recess S1 is intended to position a corner of the sensor module 2. The flat surface of the recess S1 is not in the same level as a bottom surface of the sensor module 2.

The space S for housing the sensor module 2 is in a circular shape in a plan view, and the sensor module 2 is substantially in a circular shape. The space S and the sensor module 2 have substantially the same diameter.

An opening end of the sleeve 13 defines a locking portion 13A that is crimped to hold the connector 3.

Figure 3:
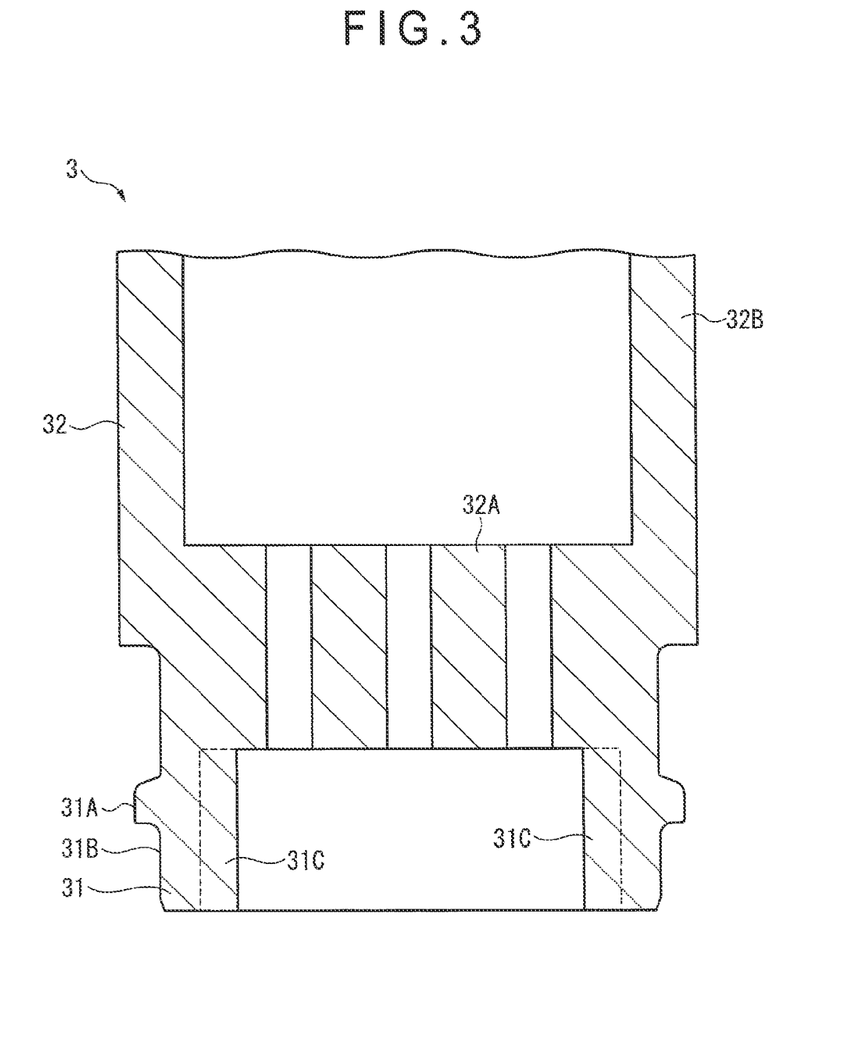
FIG. 3 is a sectional view showing a relevant part of a connector.

FIG. 3 schematically shows the connector 3.

As shown in FIGS. 1 to 3, the connector 3, which is a synthetic resin component, includes: an annular base 31 held by the locking portion 13A; and a body 32 being integral with the base 31 and supporting the terminals 4.

An end 3A of the base 31, which is opposite to the body 32, has a circumferential surface provided with a shoulder 31A that is to be engaged with the locking portion 13A. A portion of the base 31 near the opening end relative to the shoulder 31A defines a recess 31B. A sealing member 33 in the form of an O-ring is provided between the recess 31B and an inner circumferential surface of the sleeve 13.

An inner circumferential surface of the base 31 is provided with locking projections 31C at positions opposite across an axial center of the connector 3. The locking projections 31C are each in a rectangular shape in a plan view (see FIG. 4).

The inner circumferential surface of the base 31 is also provided with a step 31S engageable with a corner of the module body 20 (see FIG. 2). When the module body 20 is engaged with the step 31S of the connector 3, which is fixed to the joint 11 by crimping the locking portion 13A, the module body 20 is prevented from being raised by a force that is applied to the module body 20 in a raising direction by the fluid to be measured introduced through the introduction hole 1A of the joint 11.

The body 32 includes: a plate portion 32A where the terminals 4 are insert-molded; and a cylindrical portion 32B integral with an outer periphery of the plate portion 32A.

As shown in FIGS. 1 and 2, the terminals 4 are each in the form of an L-shaped metal piece. A base end of a first long side of the L-shape is held in the plate portion 32A, and a portion defined from a middle portion thereof to a tip end thereof projects into the cylindrical portion 32B. A second long side of the L-shaped terminal(s) 4 faces the plate portion 32A.

The connecting member 5 includes: an elastic electrically conductive member 51 having a first end electrically connected to the second long side of the terminal(s) 4 and a second end connected to the sensor module 2; and an elastic member 52 biasing the second end of the electrically conductive member 51 toward the sensor module 2.

The electrically conductive member 51 is in the form of a metal connecting fitting made by bending a plate member. The elastic force of the connecting fitting biases the first end of the electrically conductive member 51 toward the terminal(s) 4 and the second end of the electrically conductive member 51 toward the sensor module 2. It should be noted that the first and second ends of the electrically conductive member 51 are respectively bonded to the terminal(s) 4 and the sensor module 2 with an electrically conductive adhesive or by welding (not shown) as needed.

The elastic member 52, which is a silicone rubber cushion in the shape of a rectangular pillar, has a first end fitted in a recess 31D provided to the base 31 of the connector 3. A second end of the elastic member 52 is in contact with the second end of the electrically conductive member 51.

Figure 4:
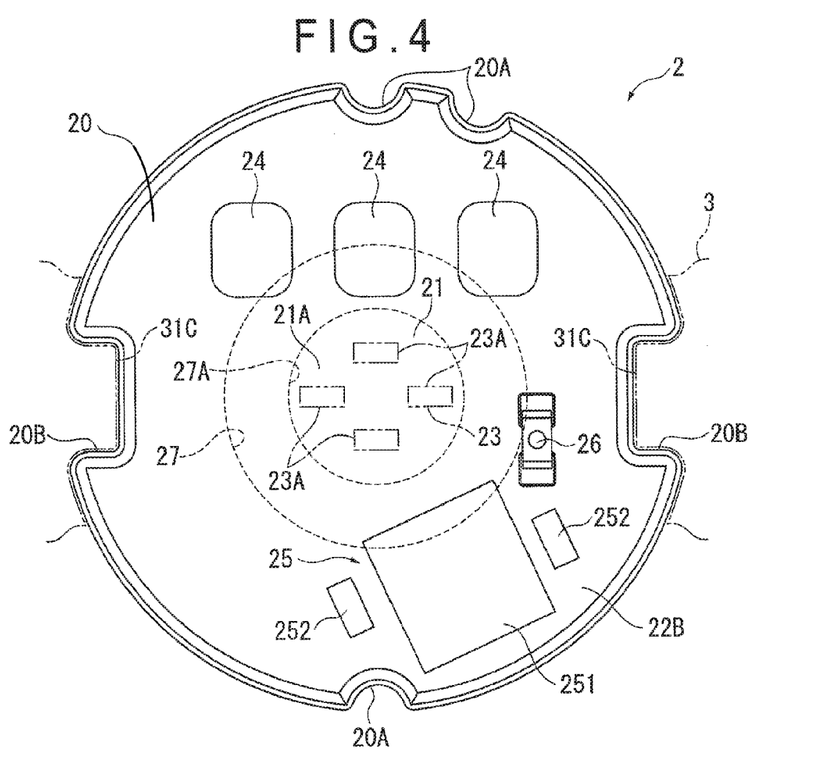
FIG. 4 is a plan view showing a sensor module according to the first exemplary embodiment of the invention.
Figure 5:
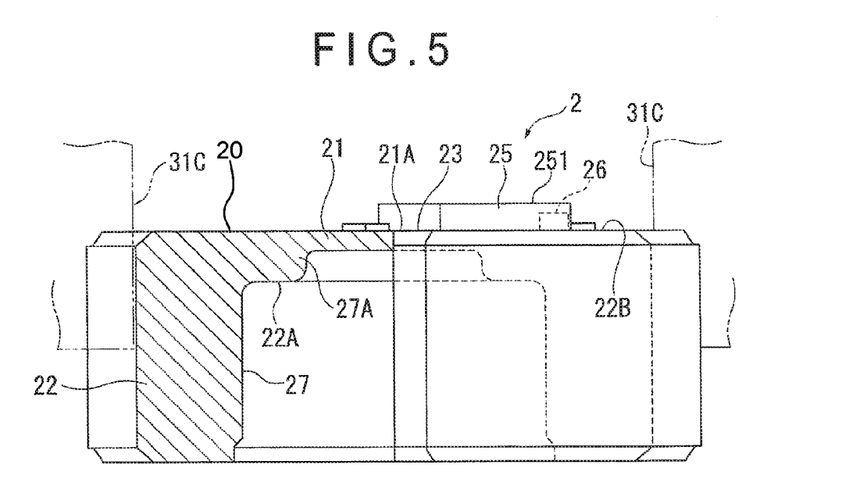
FIG. 5 is a partially cutaway side view showing the sensor module.

FIGS. 4 and 5 show a specific arrangement of the sensor module 2.

As shown in FIGS. 4 and 5, the sensor module 2 includes: a ceramic module body 20 including a diaphragm 21 and a cylindrical portion 22 integral with a periphery of the diaphragm 21; a detector 23 that detects a displacement of the diaphragm 21; a pad 24 electrically connected to the detector 23; and an electronic component 25 and a temperature measuring element 26 that are provided to the module body 20.

The diaphragm 21 is in the shape of a thin disc, and is displaceable by a pressure of the fluid to be measured introduced through the joint 11. A surface of the diaphragm 21 facing the projection 15 is defined as a contact surface for the fluid to be measured (see FIGS. 1 and 2).

A surface of the diaphragm 21 opposite to the contact surface for the fluid to be measured defines a flat surface 21A provided with the detector 23.

The detector 23 includes: strain gauges 23A arranged at four positions; and an electrically conductive pattern (not shown) connected to the strain gauges 23A.

An outer periphery of the cylindrical portion 22 is provided with an outer groove 20A and a locking groove 20B that are parallel with an axial direction of the cylindrical portion 22.

The outer groove 20A is used for positioning the sensor module 2 using a positioning device (not shown) to pattern-print, for instance, the detector 23 and the electrically conductive pattern (not shown) on a flat surface of the sensor module 2.

In order to accurately position the sensor module 2, the outer groove 20A includes grooves arranged at three positions at irregular intervals. Specifically, two of the outer grooves 20A are opposed to each other across an axial center of the sensor module 2, and the other one of the outer grooves 20A is provided close to either one of the two opposed outer grooves 20A.

The locking groove 20B, which is engageable with the locking projections 31C of the connector 3 to restrain a circumferential movement of the sensor module 2 relative to the connector 3, includes grooves arranged at positions corresponding to the locking projections 31C and opposed to each other across an axial center of the cylindrical portion 22 in the first exemplary embodiment. It should be noted that a relative movement between the locking grooves 20B and the locking projections 31C in an axial direction of the sensor module 2 is permitted.

The two locking grooves 20B each have a rectangular flat surface, and respective opening ends thereof open in mutually opposite directions.

An inner circumferential surface of the cylindrical portion 22 defines an attached portion 27 that is to be attached to the housing 1. The attached portion 27 is provided with a step 27A at a position near the diaphragm 21. The step 27A defines a module-side flat surface 22A extending in a radial direction of the cylindrical portion 22. A portion of the attached portion 27 near the opening end relative to the step 27A faces an outer circumferential surface of the projection 15 (see FIGS. 1 and 2).

As shown in FIGS. 1 and 2, an O-ring 6 is provided between the module-side flat surface 22A and the housing-side flat surface 15A of the housing 1. The module-side flat surface 22A and the housing-side flat surface 15A, which are configured to restrain a movement of the O-ring 6 in the axial direction of the projection 15, are parallel with each other when the sensor module 2 is attached to the projection 15.

A width of each of the module-side flat surface 22A and the housing-side flat surface 15A in the radial direction of the cylindrical portion 22 is the same as or slightly smaller than a thickness of the O-ring 6 so that the O-ring 6 can be held between the cylindrical portion 22 and the projection 15.

An axial dimension of the projection 15 from the housing-side flat surface 15A to the inclined surface 15B is required at least to be the same as the thickness of the O-ring 6.

As shown in FIGS. 4 and 5, the cylindrical portion 22 defines a flat surface 22B where the pad 24, the electronic component 25 and the temperature measuring element 26 are provided. The flat surface 22B is radially outwardly adjacent to the flat surface 21A of the diaphragm 21, and is in the same plane as the flat surface 21A.

The pad 24 includes pads that are arranged at three positions and each connected to the end of the electrically conductive member 51. An electrically conductive pattern (not shown) provided between the pad(s) 24 and the detector 23 is electrically connected to the electronic component 25 and the temperature measuring element 26.

The electronic component 25, which is opposed to the pad(s) 24 across the flat surface 21A, includes one ASIC circuit 251 and a plurality of capacitors 252.

The temperature measuring element 26 is a chip component that detects a temperature of the fluid to be measured through the module body 20.

In assembling the above physical quantity measuring device, the module body 20 is first made of ceramic.

The module body 20 may be made by a variety of methods. For instance, a die (not shown) is filled with ceramic powder to form a molded article, which is then sintered. A step for forming the module-side flat surface 22A is provided in the die in advance. The module-side flat surface 22A is thus formed as a part of the molded article.

The molded article is then fired at a predetermined temperature in a furnace (not shown), and taken out of the furnace.

The detector 23, the pads 24 and an electrically conductive pattern resist are provided on the flat surfaces 21A, 22B of the diaphragm 21 and the cylindrical portion 22 of the thus-manufactured module body 20. Subsequently, the electronic component 25 and the temperature measuring element 26 are attached to the flat surface 22B of the cylindrical portion 22.

Further, a metal block is, for instance, ground into the housing 1. The housing-side flat surface 15A is also provided to the projection 15 at the same time as the process for manufacturing the housing 1. Other components of the physical quantity measuring device are also manufactured in advance.

Subsequently, the O-ring 6 is set on the outer circumferential surface of the projection 15 of the housing 1, and then the sensor module 2, which has been attached with the electronic component 25, the temperature measuring element 26 and any other necessary members, is attached to the projection 15.

Further, the terminals 4 are integrally provided to the connector 3 by insert-molding. The elastic member 52 is fitted into the recess 31D of the connector 3, the terminals 4 are each connected to the first end of the electrically conductive member 51 by welding or the like, an electrically conductive adhesive or the like is applied to the pads 24, and the connector 3 is pushed into the housing 1 with the second end of the electrically conductive member 51 being pressed against each of the pads 24 by the elastic member 52. The second end of the electrically conductive member 51 and each of the pads 24 are fixed to each other with, for instance, the electrically conductive adhesive.

Subsequently, the housing 1 is crimped to hold the connector 3.

The first exemplary embodiment thus provides the following effects (1) to (7).

(1) The sensor module 2 is housed in the housing 1, the connector 3 is attached to the housing 1, the terminals 4 are provided to the connector 3, and the electrically conductive member 51 is provided between the terminal(s) 4 and the pad(s) 24 of the sensor module 2. When the connector 3 is attached to the housing 1, the elastic electrically conductive member 51 is elastically deformed to be reliably connected to the end of the terminal(s) 4. The terminal(s) 4 and the pad(s) 24 can thus be easily and reliably electrically connected to each other.

Further, the sensor module 2 includes: the module body 20 including the diaphragm 21 and the cylindrical portion 22 integral with the periphery of the diaphragm 21; the detector 23 provided on the flat surface 21A of the diaphragm 21; and the pad(s) 24 and the electronic component 25 provided on the flat surface 22B of the cylindrical portion 22 radially outwardly adjacent to the flat surface 21A. The diaphragm 21 can thus be displaced by the fluid to be measured introduced into the sensor module 2 without being hindered by the pad(s) 24 and the electronic component 25, so that the physical quantity can be properly measured. The electronic component 25 is provided on a part of the flat surface 22B of the cylindrical portion 22. Since a space for arranging the pads is defined at the opposite side across the flat surface 21A of the diaphragm 21, the pads 24 can be easily arranged.

Since the module body 20 is a ceramic rigid member, the electronic component 25 can be easily electrically connected.

(2) The attached portion 27 defined at the inner circumferential surface of the cylindrical portion 22 is provided with the step 27A defining the module-side flat surface 22A, so that a portion of the flat surface 22B of the cylindrical portion 22 corresponding to the step is usable as a space for arranging the electronic component 25. Further, since the portion of the attached portion 27 near the opening relative to the step 27A of the cylindrical portion 22 has an inner diameter larger than a diameter of the diaphragm 21, the outer diameter of the projection 15, which is to be attached with the module body 20, can be increased.

(3) The temperature measuring element 26 is provided on the flat surface 22B of the cylindrical portion 22, so that the measurement accuracy is not significantly lowered even when the temperature measuring element 26 is distanced from the side of the module body 20 where the fluid to be measured is introduced. Further, since the temperature measuring element 26 is provided not to the diaphragm 21 but to the cylindrical portion 22, the diaphragm 21 can be displaced without being hindered by the temperature measuring element 26.

(4) The electrically conductive member 51 is the connecting fitting, and the first end thereof is biased toward the pad(s) 24 by the elastic member 52, thereby reliably connecting the electrically conductive member 51 to the pad(s) 24.

(5) The housing 1 is crimped to hold the connector 3. The connector 3 can thus be easily connected to the housing 1. Further, after connected to the housing 1, the connector 3 is not easily detached from the housing 1.

(6) The locking projections 31C of the connector 3 are engaged with the locking grooves 20B of the outer circumferential surface of the sensor module 2, thereby preventing rotation of the sensor module 2 relative to the connector 3, and thus preventing displacement of a connecting point between the electrically conductive member 51 and the pad(s) 24 and a connecting point between the electrically conductive member 51 and the terminal(s) 4. Consequently, a problem due to disconnection can be prevented.

(7) The projection 15 of the housing 1 defines the housing-side flat surface 15A facing the module-side flat surface 22A, and the O-ring 6 is provided between the module-side flat surface 22A and the housing-side flat surface 15A. The first exemplary embodiment can thus provide a simple arrangement for holding the O-ring.

Next, a second exemplary embodiment of the invention will be described with reference to FIG. 6.

The second exemplary embodiment is the same as the first exemplary embodiment except an arrangement of an elastic electrically conductive member. It should be noted that like reference signs are attached to components identical or similar to those of the first exemplary embodiment, and the explanation thereof is omitted in the second exemplary embodiment.

Figure 6:
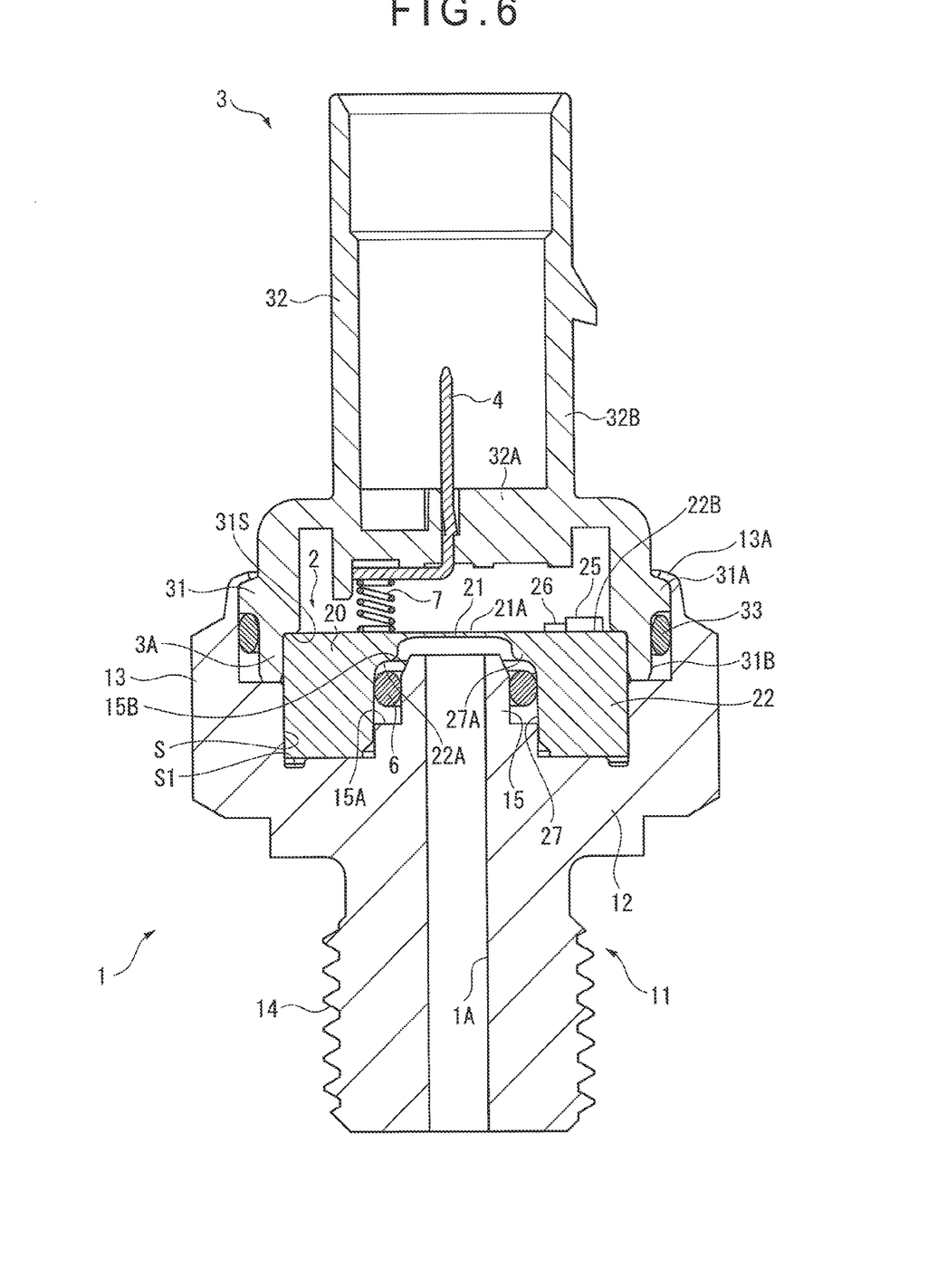
FIG. 6 is an illustration corresponding to FIG. 2, showing an overall arrangement of a physical quantity measuring device according to a second exemplary embodiment of the invention.

FIG. 6 corresponds to FIG. 2 showing the first exemplary embodiment.

As shown in FIG. 6, an elastic electrically conductive member 7 is in the form of a coil spring, and is provided between the terminal(s) 4 and the pad(s) 24 of the sensor module 2. The coil spring is fixed to the terminal(s) 4 only by a pressing force from the pad(s) 24. It should be noted that the connector 3 is provided with a guide portion (not shown) that guides the coil spring.

In the second exemplary embodiment, the assembly process of the physical quantity measuring device is substantially the same as that of the first exemplary embodiment.

In addition to the effects (1) to (3) and (5) to (7) of the first exemplary embodiment, the second exemplary embodiment can provide the following effect (8).

(8) The electrically conductive member 7 is a coil spring and provided between the terminal(s) 4 and the pad(s) 24 of the sensor module 2. The number of components can thus be reduced to structurally simplify the physical quantity measuring device as compared with the first exemplary embodiment where the electrically conductive member 51 is the connecting fitting and the end of the connecting fitting is biased toward the module body 20 by the elastic member (cushion).

Incidentally, it should be understood that the scope of the invention is not limited to the above exemplary embodiments but includes modifications and improvements compatible with the invention.

For instance, in the exemplary embodiments, the electronic component 25, which is provided directly on the flat surface 22B of the cylindrical portion 22, includes the ASIC circuit 251 and the capacitors 252, but may include either one of the ASIC circuit 251 and the capacitors 252, or may alternatively include an amplifier circuit in place of these electronic members.

In the exemplary embodiments, the attached portion 27 defined at the inner circumferential surface of the cylindrical portion 22 is provided with the step 27A having the module-side flat surface 22A, but the step 27A is not necessarily provided to the attached portion 27 of the cylindrical portion 22 according to the invention.

In the exemplary embodiments, the module-side flat surface 22A extending in a direction orthogonal to the axial direction of the cylindrical portion 22 and the housing-side flat surface 15A extending in a direction orthogonal to the axial direction of the projection 15 are provided to restrain the movement of the O-ring 6 along the axial direction of the projection 15, but may be replaced by any other arrangement as long as the movement of the O-ring 6 can be restrained. For instance, the projection 15 may be provided with a groove for holding the O-ring 6.

Further, the ceramic sensor module 2 and the housing 1 may be manufactured by a method different from that of the exemplary embodiments. For instance, the module body 20 (i.e., a base of the sensor module 2) may be molded using a die, and provided with the module-side flat surface 22A by cutting or grinding.

The temperature measuring element 26 provided on the flat surface 22B of the cylindrical portion 22 is optional, and may be omitted depending on the type of the physical quantity measuring device.

Even when the temperature measuring element 26 is provided on the flat surface 22B of the cylindrical portion 22, the temperature measuring element 26 is not necessarily a chip component. For instance, the temperature measuring element 26 may be made by firing a paste, for instance, printed on the flat surface 22B of the cylindrical portion 22.

Further, in the exemplary embodiments, the housing 1 is formed from a metal member, but a joint may be formed from a synthetic resin member according to the invention.

The electronic component 25 is opposed to the pad(s) 24 across the flat surface 21A, but it is not requisite. For instance, when the flat surface 21A of the sensor module 2 has a large area, the electronic component 25 may be adjacent to the pad(s) 24.

Further, in the exemplary embodiments, the pressure sensor is described as the physical quantity measuring device, but the invention is applicable to, for instance, a differential pressure sensor and a temperature sensor.

What is claimed is:

1. A physical quantity measuring device comprising:
   a sensor module;
   a housing that houses the sensor module;
   a connector provided to the housing;
   a terminal provided to the connector; and
   an elastic electrically conductive member provided in a space between the sensor module and the connector and interposed between the terminal and the sensor module, the sensor module comprising:
   a ceramic module body comprising:
      a diaphragm displaceable by a pressure of a fluid to be measured introduced into the sensor module; and
      a cylindrical portion integral with a periphery of the diaphragm;
   a detector comprising a strain gauge provided on a flat surface of the diaphragm opposite to a surface of the diaphragm that is to be in contact with the fluid to be measured, the detector detecting a displacement of the diaphragm;
   a pad provided on a flat surface of the cylindrical portion radially outwardly adjacent to the flat surface of the diaphragm, the pad being electrically connected to the detector and being connected to the electrically conductive member; and
   an electronic component provided on the flat surface of the cylindrical portion and electrically connected with the detector and the pad, the electronic component being provided opposing the pad across the flat surface of the diaphragm.

2. The physical quantity measuring device according to claim 1, wherein
   the cylindrical portion has an inner circumferential surface defining an attached portion attachable to the housing, and
   the attached portion of the cylindrical portion is provided with a step defining a module-side flat surface extending in a radial direction of the cylindrical portion.

3. The physical quantity measuring device according to claim 2, wherein
   the housing comprises a projection having an outer circumferential surface attachable with the attached portion of the cylindrical portion and defining therein an introduction hole through which the fluid to be measured is introduced,
   the projection is provided with a housing-side flat surface facing the module-side flat surface, and
   an O-ring is provided between the module-side flat surface and the housing-side flat surface.

4. The physical quantity measuring device according to claim 1, further comprising a temperature measuring element provided on the flat surface of the cylindrical portion.

5. The physical quantity measuring device according to claim 1, wherein the connector is held in the housing by crimping.

6. The physical quantity measuring device according to claim 1, wherein
   a locking projection is provided to the connector, and
   a locking groove engageable with the locking projection is provided to an outer circumferential surface of the sensor module.

* * * * *